United States Patent Office 3,513,197
Patented May 19, 1970

3,513,197
ISOTHIURONIUM SALTS
Werner Daum, Krefeld-Bockum, and Wilfried Paulus, Krefeld-Gartenstadt, Germany, assignors to Farbenfabriken Bayer Aktiengesellschaft, Leverkusen, Germany, a corporation of Germany
No Drawing. Filed May 24, 1967, Ser. No. 640,823
Claims priority, application Germany, May 26, 1966, F 49,295
Int. Cl. C07c *129/00;* A01n *9/20*
U.S. Cl. 260—564         3 Claims

ABSTRACT OF THE DISCLOSURE 3-benzyl-isothiuronium salt and a method for inhibiting algae in a media susceptible to growth thereof by treating with an active algicidal amount of said salt.

The present invention relates to isothiuronium salts; more particularly it concerns isothiuronium salts of the formula

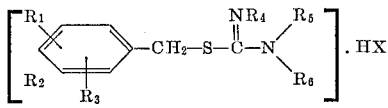

in which $R_1$, $R_2$ and $R_3$, independently of one another, represent hydrogen, chlorine or an alkyl radical containing 1 to 4 larbon atoms, and $R_4$, $R_5$ and $R_6$ stand, independently of one another, for hydrogen or an alkyl radical, and one of the symbols $R_4$, $R_5$ and $R_6$ may also stand for an aromatic radical and the symbols $R_4$ and $R_5$ or $R_4$ and $R_6$ may also denote an alkylene bridge containing 2 to 3 carbon atoms, while X stands for an anion.

The isothiuronium salts of the above formula can be obtained, for example, by reacting compounds of the formulae

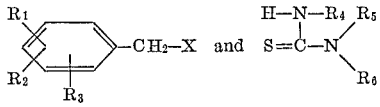

in which $R_1$ to $R_6$ have the same meaning as above and
X stands for chlorine, with one another in water, alcohols or ketones at an elevated temperature.

The isothiuronium salts of the present invention are suitable for combating a great variety of algae, e.g. Chlorophyceae, Phaeophyceae, Cyanophyceae and Diatomeae. The necessary amounts can readily be determined by preliminary experiments; in general, amounts of 1 to 15 mg. per litre of algae-containing water have proved to be sufficient.

In comparison with the quaternary ammonium compounds of the type of the alkyl-dimethyl-benzyl ammonium chlorides which contain an alkyl radical with 8 to 18 carbon atoms and which are known as algicidal agents, the isothiuronium salts of the present invention are distinguished by a lesser tendency of forming foam and also by being less readily inactivated.

The outstanding algicidal activity of the isothiuronium salts of the invention can be seen from the following table.

| Isothiuronium salts: | Inhibition value mg./litre |
|---|---|
| S-benzyl-isothiuronium chloride | 10 |
| S-(3,6-dimethylbenzyl)-isothiuronium chloride | 15 |
| S-(4,6-dimethylbenzyl)-isothiuronium chloride | 15 |
| S-(3,6-diisopropylbenzyl)-isothiuronium chloride | 1.5 |
| S-(4,6-diisopropylbenzyl)-isothiuronium chloride | 2 |
| S - (3,6 - diisopropylbenzyl - N - methyl - isothiuronium chloride | 2 |
| S-(3,4-dichlorobenzyl)-isothiuronium chloride | 5 |
| S-benzyl-N-phenyl-isothiuronium chloride | 5 |

The inhibition values were determined in the following manner:

A mixed culture of green algae, brown algae, blue algae and a silicified algae were cultured for two weeks in the neutral nutrient solutions (Allen's nutrient solutions) containing, per litre of water, 1000 mg. sodium nitrate, 513 mg. Epsom salt, 250 mg. dipotassium hydrogen phosphate, 50 mg. ammonium chloride, 50 mg. calcium chloride and 3 mg. iron(III) chloride. After the algae had been allowed to grow during this period of time without interference, the nutrient solutions, which then had a deep green colour, were treated with varying amounts of the isothiuronium salts taken into consideration and cultured for a further 6 weeks. The stated inhibition values are minimum amounts in mg./litre with which the nutrient solutions were completely colourless after culturing for six weeks.

The 3,4- or 4,6-diisopropylbenzyl chlorides which yield by the reaction with thiourea or N-methyl-thiourea, according to the method described in J. Pr. Chem. 7, 288–290 (1959) and 16, 203–204 (1962), the particularly effective compounds specified in the table: S-(3,6-diisopropyl-benzyl)isothiuronium chloride (M.P. 202.5–202° C. from water), S-(4,6-diisopropyl-benzyl)-isothiuronium chloride (M.P. 186° C. from water) and S-(3,6-diisopropyl-benzyl)-N-methyl-isothiuronium chloride (M.P. 159° C. from isobutanol), can be obtained in the following manner: a mixture of 1 mol 1,4- or 1,3-diisopropyl-benzene, 1 mol formaldehyde (in the form of paraformaldehyde), 0.5 mol zinc chloride and 100 ml. anhydrous acetic acid is saturated at about 40° C. with hydrogen chloride, and then heated at 70° C. for about 6 hours; the reaction mixture is then cooled to room temperature and diluted with water; the precipitated reaction product is washed with water, then dried and distilled through a 30 cm. long Vigreux column (B.P. of 3,6-diisopropyl-benzyl chloride: 64–67° C./0.09 mm. Hg; B.P. of 4,6-diisoproply-benzyl chloride: 61–63° C./0.03 mm. Hg).

The outstanding algicidal action of the isothiuronium salts of the invention is further evident from the following test:

In aquaria containing 5 litres each of Allen's nutrient solution described above, mixed cultures of algae consisting of green algae, brown algae, blue algae and silicified algae were cultured for 3 weeks while continuously passing through air bubbles. The nutrient solutions, which then exhibited a deep green colour, were admixed with 25 mg. S-(3,6-diisopropyl-benzyl)-isothiuronium chloride or with 25 mg. S-(4,6-diisopropyl-benzyl)-isothiuronium chloride. Thereupon the nutrient solution lost their colour within one week and did not exhibit any growth of algae even after a further 6 weeks. Algae which were subsequently again introduced into the aquaria also did not grow any more.

We claim:
1. S-(3,6-diisopropyl-benzyl)-isothiuronium chloride.
2. S-(4,6-diisopropyl-benzyl)-isothiuronium chloride.
3. S-(3,6-diisopropyl-benzyl)-N-methyl-isothiuronium chloride.

References Cited

UNITED STATES PATENTS 2,640,079  5/1953  DeBenneville et al. ___ 260—564
2,708,679  5/1955  Lo et al. _____ 260—564

FOREIGN PATENTS 945,808  1/1964  Great Britain.

OTHER REFERENCES

Hach et al., "Chemical Abstracts," vol. 51, pp. 10403–4 (1957).

Lecher et al., "Chemical Abstracts," vol. 20, p. 374 (1926).

ROBERT V. HINES, Primary Examiner

U.S. Cl. X.R.

260—576.6, 651; 424—326